(12) United States Patent
Sprengel et al.

(10) Patent No.: US 8,712,638 B2
(45) Date of Patent: Apr. 29, 2014

(54) CONTROL UNIT OF A RIDE LEVEL CONTROL SYSTEM, AND RIDE LEVEL CONTROL SYSTEM

(75) Inventors: Thomas Sprengel, Stuttgart (DE); Claus Blattner, Beilngries (DE)

(73) Assignee: Dr. Ing. H.C.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 13/585,150

(22) Filed: Aug. 14, 2012

(65) Prior Publication Data

US 2013/0046440 A1    Feb. 21, 2013

(30) Foreign Application Priority Data

Aug. 15, 2011  (DE) .......................... 10 2011 052 703

(51) Int. Cl.
    *B60G 17/018*    (2006.01)
(52) U.S. Cl.
    USPC ............................................................. 701/37
(58) Field of Classification Search
    USPC .................................................... 701/37, 85
    See application file for complete search history.

(56) References Cited

U.S. PATENT DOCUMENTS

| | | | |
|---|---|---|---|
| 5,048,867 A * | 9/1991 | Gradert ...................... | 280/6.159 |
| 6,766,683 B2 * | 7/2004 | Kalker ...................... | 73/116.01 |
| 6,935,625 B2 * | 8/2005 | Bolt et al. ................... | 267/64.16 |
| 7,066,474 B2 * | 6/2006 | Hiebert et al. .............. | 280/6.153 |
| 7,841,608 B2 * | 11/2010 | Morris et al. ............. | 280/124.16 |
| 2005/0040573 A1 * | 2/2005 | Bolt et al. ................... | 267/64.28 |
| 2010/0309596 A1 * | 12/2010 | Ylinen et al. ................... | 361/78 |

FOREIGN PATENT DOCUMENTS

| | | |
|---|---|---|
| DE | 102006054976 | 5/2008 |
| DE | 102007057836 | 6/2009 |

OTHER PUBLICATIONS

German Search Report, mailed Mar. 28, 2012 in priority application DE 10 2011 052 703.6 (w/partial English Translation).

* cited by examiner

*Primary Examiner* — Mary Cheung
*Assistant Examiner* — Anne Mazzara
(74) *Attorney, Agent, or Firm* — RatnerPrestia

(57) ABSTRACT

A control unit of a pneumatic ride level control system of a motor vehicle, the control unit deactivating at least one function of the pneumatic ride level control system and/or activating at least one function of the pneumatic ride level control system if a limiting value of at least one dynamic-movement variable is exceeded or undershot, keeping the or each deactivated function deactivated for a defined holding time and/or keeping the or each activated function activated for a defined holding time duration after a subsequent undershooting or exceeding of the limiting value, and subsequently ending the deactivation of the or each deactivated function and/or the activation of the or each activated function after the respective holding time duration has elapsed, and the control unit defining the respective holding time duration as a function of the magnitude of the exceeding or undershooting of the respective limiting value.

11 Claims, 1 Drawing Sheet

CONTROL UNIT OF A RIDE LEVEL CONTROL SYSTEM, AND RIDE LEVEL CONTROL SYSTEM

CROSS-REFERENCE TO RELATED APPLICATIONS

This U.S. patent application claims priority to German Patent Application DE 10 2011 052 703.6, filed Aug. 15, 2011, which is incorporated by reference herein in its entirety.

FIELD OF INVENTION

The invention relates to a control unit of a pneumatic ride level control system of a motor vehicle, the control unit deactivating at least one function of the pneumatic ride level control system and/or activating at least one function of the pneumatic ride level control system if a limiting value of at least one dynamic-movement variable is exceeded or undershot, keeping the or each deactivated function deactivated for a defined holding time and/or keeping the or each activated function activated for a defined holding time duration after a subsequent undershooting or exceeding of the limiting value, and subsequently ending the deactivation of the or each deactivated function and/or the activation of the or each activated function after the respective holding time duration has elapsed. Furthermore, the invention relates to a pneumatic ride level control system of a motor vehicle, having pneumatic springs which are coupled via air lines to an air supply, having actuable valves which are assigned to the air lines and can be actuated by a control unit.

BACKGROUND

DE 10 2006 036 912 A1 has disclosed a pneumatic ride level control system of a motor vehicle, the ride level control system which is disclosed there having pneumatic springs which are coupled via compressed air lines to an air supply. The compressed air lines are assigned valves which can be actuated by a control unit. The control unit of the ride level control system which is known from this prior art can terminate a control operation, the ride level control system being started up again after termination of a control operation only after a switch-on condition of an initialization signal is met.

In the case of pneumatic ride level control systems which are known from practice, it is known that the control unit of the ride level control system controls and/or regulates the operation of the latter on the basis of at least one dynamic-movement variable, it being possible for the or each dynamic-movement variable to be, for example, a transverse acceleration and/or a longitudinal acceleration and/or at least one further dynamic-movement variable of the motor vehicle. For instance, it is already known from practice to end a control operation of the ride level control system automatically when the longitudinal acceleration and/or the transverse acceleration exceeds a limiting value, the control unit allowing the control function to be switched off for a defined holding time when the transverse acceleration and the longitudinal acceleration subsequently undershoot the respective limiting value again, and permitting the switching on of the control function again only after said holding time has elapsed. In the case of control units known from practice for a pneumatic ride level control system, a fixed or constant holding time is implemented to this end in the control unit.

SUMMARY

Proceeding from this, the present invention is based on the object of providing a novel control unit of a pneumatic ride level control system and a novel ride level control system.

This object is achieved by a control unit of a pneumatic ride level control system of a motor vehicle, the control unit deactivating at least one function of the pneumatic ride level control system and/or activating at least one function of the pneumatic ride level control system if a limiting value of at least one dynamic-movement variable is exceeded or undershot, keeping the or each deactivated function deactivated for a defined holding time and/or keeping the or each activated function activated for a defined holding time duration after a subsequent undershooting or exceeding of the limiting value, and subsequently ending the deactivation of the or each deactivated function and/or the activation of the or each activated function after the respective holding time duration has elapsed, wherein the control unit defines the respective holding time duration as a function of the magnitude of the exceeding or undershooting of the respective limiting value.

According to aspects of the invention, the control unit defines the respective holding time duration as a function of the magnitude of the exceeding or undershooting of the respective limiting value.

A constant holding time duration is not implemented in the control unit according to aspects of the invention; rather, the control unit defines the respective holding time duration as a function of the magnitude of the exceeding or undershooting of the respective limiting value by the respective dynamic-movement variable. As a result, optimum driving properties of a motor vehicle can be provided. Thus, both excessively long holding time durations and excessively short holding time durations can be avoided. To this end, the control unit according to aspects of the invention adapts the respective holding time duration automatically to the extent of the exceeding or undershooting of the respective limiting value.

According to one advantageous development of the invention, an individual limiting value is stored for each dynamic-movement variable in the control unit of the pneumatic ride level control system, the control unit deactivating at least one function of the pneumatic ride level control system automatically and/or activating at least one function of the pneumatic ride level control system automatically if said limiting value is exceeded or undershot. When an individual limiting value is stored for each dynamic-movement variable, the dynamic-movement behavior of the motor vehicle can be improved further, since a differentiated reaction to the exceeding or undershooting of the respective limiting values is possible.

An individual dependence is preferably stored for each dynamic-movement variable in the control unit of the pneumatic ride level control system, on the basis of which dependence the control unit defines the respective holding time duration automatically as a function of the magnitude of the exceeding or undershooting of the respective limiting value. When an individual dependence is stored for each dynamic-movement variable in the control unit, on the basis of which dependence the respective holding time duration is defined, a further improvement of the dynamic-movement properties of the motor vehicle is possible.

According to a further advantageous development of the invention, the control unit defines the respective holding time duration, furthermore, as a function of an activated driving program, in particular as a function of an activated sports driving program or an activated offroad driving program or an activated onroad driving program. Individual limiting values are preferably stored for each driving program in the control unit, at least one function being deactivated and/or at least one function being activated if said individual limiting values are exceeded or undershot, as are likewise individual dependences, on the basis of which the control unit defines the respective holding time duration as a function of the magnitude of the exceeding or undershooting of the respective limiting value. The storing of individual limiting values and individual dependences for defining the respective holding time duration as a function of the selected driving program permits further optimization of the dynamic-movement properties of a motor vehicle.

The ride level control system according to aspects of the invention includes pneumatic springs which are coupled via air lines to an air supply and actuable valves which are assigned to the air lines and can be actuated by a control unit, wherein the control unit defines the respective holding time duration as a function of the magnitude of the exceeding or undershooting of the respective limiting valve.

BRIEF DESCRIPTION OF THE DRAWINGS

Preferred developments of the invention result from the subclaims and the following description. Without being restricted hereto, exemplary embodiments of the invention will be explained in more detail using the drawing, in which:

DETAILED DESCRIPTION

Figure 1:
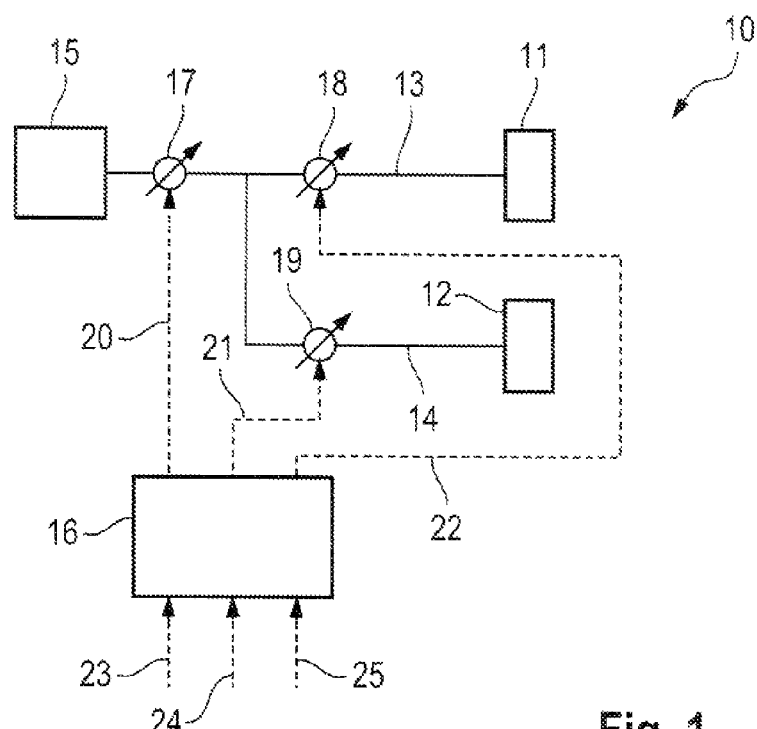
FIG. 1 shows a highly diagrammatic illustration of a pneumatic ride level control system.

FIG. 1 shows a diagrammatic illustration of a pneumatic ride level control system of a motor vehicle. The ride level control system 10 which is shown in FIG. 1 has pneumatic springs 11, 12, the pneumatic springs 11, 12 being coupled via compressed air lines 13, 14 to an air accumulator 15. The compressed air lines 13, 14 are assigned valves 17, 18 and 19 which can be actuated by a control unit 16. The control unit 16 outputs output variables 20, 21 and 22, on the basis of which the actuable valves 17, 18 and 19 are actuated, namely are opened or closed. The control unit 16 defines said output variables 20, 21 and 22 on the basis of input variables 23, 24 and 25, said input variables being dynamic-movement variables of the motor vehicle.

It is to be noted at this point that the number of pneumatic springs 11, 12 shown in FIG. 1, the number of valves 17, 18 and 19 shown, the number of output variables 20, 21 and 22 shown of the control unit 16 and the number of input variables 23, 24 and 25 shown of said control unit 16 are of purely exemplary nature and can differ from FIG. 1.

If a limiting value of at least one dynamic-movement variable is exceeded or undershot, the control unit 16 of the pneumatic ride level control system 10 deactivates at least one function of the pneumatic ride level control system 10 and/or activates at least one function of the latter. After the respective limiting value is subsequently undershot or exceeded, the control unit 16 keeps the or each deactivated function deactivated for a defined holding time duration and/or keeps the or each activated function activated for a defined holding time duration. Subsequently, after the respective holding time has elapsed, the control unit 16 automatically ends the deactivation of the or each function which is deactivated as a consequence of the undershooting or exceeding of the respective limiting value and/or automatically ends the activation of the or each function which is activated as a consequence of the undershooting or exceeding of the respective limiting value.

According to aspects of the invention, it is provided that the control unit 16 defines the respective holding time duration as a function of the magnitude of the exceeding or undershooting of the respective limiting value.

Accordingly, according to aspects of the invention, a constant, always identical holding time duration is not stored in the control unit 16; rather, the respective holding time duration is individually defined as a function of the magnitude and therefore extent of the exceeding or undershooting of the respective limiting value. As a result, it is possible to improve the dynamic-movement behavior of a motor vehicle in comparison with the prior art.

Figure 2:
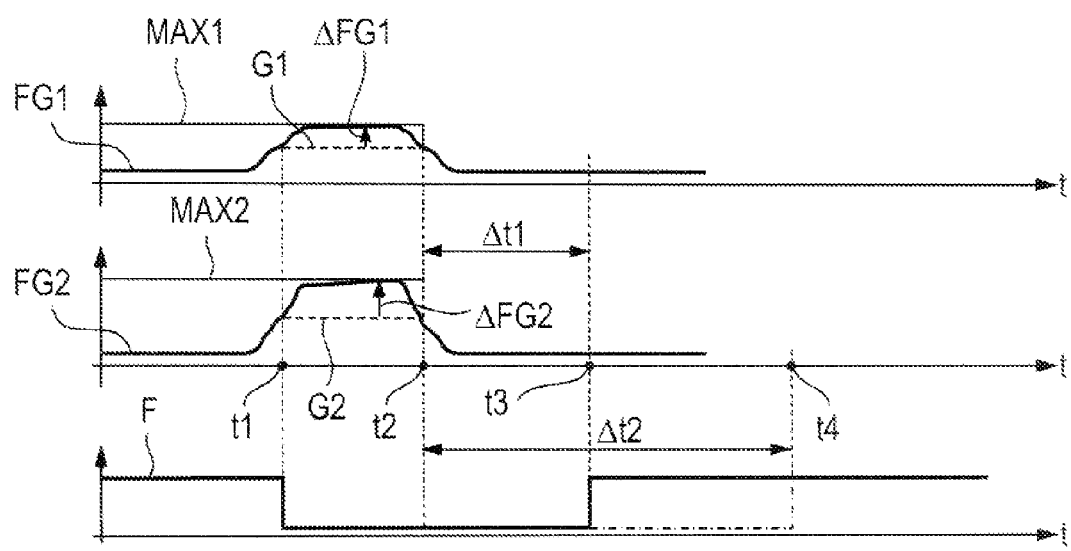
FIG. 2 shows a diagram for clarifying the method of operation of the control unit of the pneumatic ride level control system.

In a diagrammatic and exemplary manner, FIG. 2 shows time profiles of a dynamic-movement variable FG1 and FG2, the dynamic-movement variable FG1 and FG2 exceeding a limiting value G1 and G2, respectively, in each case at an instant t1 in FIG. 2. Beginning with this exceeding of the limiting value G1 and G2 by the dynamic-movement variable FG1 and FG2, respectively, that is to say beginning at the instant t1, a function F of the pneumatic ride level control system 10 is deactivated automatically by the control unit 16.

Furthermore, it can be gathered from FIG. 2 that, in each case at the instant t2, the monitored, dynamic-movement variable FG1 and FG2 again undershoots the respective limiting value G1 and G2. Subsequently, that is to say following the undershooting of the limiting value G1 and G2 by the dynamic-movement variable FG1 and FG2, respectively, the control unit 16 keeps the deactivation of the function F deactivated for a holding time duration Δt1 and Δt2, respectively, it being possible to gather from FIG. 2 that the holding time durations Δt1 and Δt2 differ from one another.

In the upper curve of FIG. 2, in which the monitored, dynamic-movement variable FG1 exceeds the corresponding limiting value G1 by the amount ΔFG1=MAX1−G1, the control unit 16 automatically defines the holding time duration Δt1 as a function of the amount ΔFG1=MAX1−G1, whereas, in the middle curve of FIG. 2, in which the monitored, dynamic-movement variable FG2 exceeds the corresponding limiting value G2 by the amount ΔFG2=MAX2−G2, the control unit 16 defines the holding time duration Δt2 as a function of the amount ΔFG2, by which the dynamic-movement variable FG2 exceeds the respective limiting value G2.

Subsequently, the deactivation of the dynamic-movement function F of the ride level control system 10 ends at the instant t3 or at the instant t4 as a function of the holding time duration Δt1 or Δt2 which is defined automatically by the control unit 16.

Accordingly, in the exemplary embodiment of FIG. 2, when the respective monitored, dynamic-movement variable FG1 and FG2 exceeds the respective limiting value G1 and G2, respectively, the control unit 16 deactivates a function F of the pneumatic ride level control system. After undershooting of said limiting value G1 and G2, the deactivation of the function F is kept deactivated for a defined holding time duration Δt1 and Δt2, respectively, the deactivation by the control unit 16 being ended only after said holding time Δt has elapsed.

Here, the holding time duration Δt1 and Δt2 is a function of the magnitude of the exceeding of the respective limiting value G1 and G2 by the monitored, dynamic-movement variable FG1 and FG2, respectively. Here, in FIG. 2, the holding time duration Δt is the longer, the greater the magnitude of the exceeding of the respective limiting value G1 and G2 by the dynamic-movement variable FG1 and FG2, respectively.

The monitored, dynamic-movement variable FG can be a transverse acceleration and/or a longitudinal acceleration and/or a vertical acceleration of the motor vehicle. Furthermore, the monitored, dynamic-movement variable FG can be a longitudinal speed and/or transverse speed and/or yaw speed of the motor vehicle.

It is possible by way of the invention that, when a transverse acceleration of the motor vehicle and/or a longitudinal acceleration of the motor vehicle and/or a vertical acceleration of the motor vehicle exceed/exceeds a corresponding limiting value, the control unit 16 deactivates a function of the pneumatic ride level control system 10 automatically and, in the case of subsequent undershooting of the limiting value, keeps it deactivated automatically for a defined holding time duration, and the control unit 16 defines said holding time duration as a function of the magnitude of the exceeding of the respective limiting value. In this context, the control unit 16 can activate another function of the pneumatic ride level control system automatically and, in the case of subsequent undershooting of the limiting value, can keep it activated automatically for a defined holding time duration, said holding time duration also being defined by the control unit 16 as a function of the magnitude of the exceeding of the respective limiting value.

It is likewise possible to apply the above procedure when a transverse speed of the motor vehicle and/or a longitudinal speed of the motor vehicle and/or a yaw speed of the motor vehicle are/is monitored as dynamic-movement variables, a function of the pneumatic ride level control system being deactivated automatically when at least one of said dynamic-movement variables exceeds a corresponding limiting value, and, in the case of subsequent undershooting of the limiting value, being kept deactivated automatically for a defined holding time duration, the control unit 16 once again defining said holding time duration as a function of the magnitude of the exceeding of the respective limiting value. In this context, another function of the pneumatic ride level control system 10 can likewise once again be activated automatically by the control unit 16, and can once again be kept activated automatically for a defined holding time duration after subsequent undershooting of the limiting value.

An automatic activation of the function which was deactivated automatically previously as a consequence of the exceeding of the respective limiting value and/or an automatic deactivation of that function of the ride level control system which was activated automatically previously as a consequence of the exceeding of the respective limiting value take/takes place in each case after the respective holding time duration has elapsed.

It is likewise possible to react in an analogous manner to an undershooting of a limiting value by at least one dynamic-movement variable.

According to one advantageous development, individual limiting values are stored for each dynamic-movement variable in the control unit 16, the control unit 16 deactivating at least one function automatically and/or activating at least one function automatically if said limiting values are exceeded or undershot. It is thus possible to store in each case individual limiting values in the control unit 16 for the longitudinal acceleration and the transverse acceleration and the vertical acceleration and the transverse speed and the longitudinal speed and the yaw speed.

According to a further advantageous development of the invention, it can be provided to store a plurality of individual limiting values for each of said dynamic-movement variables, the control unit 16 defining the limiting value to be used as a function of an activated driving program. It is thus possible to store in each case individual limiting value for the dynamic-movement variables in the control unit 16 for a sports driving program and an offroad driving program and an onroad driving program.

An individual dependence is preferably stored for each dynamic-movement variable in the control unit 16, on the basis of which individual dependence the control unit 16 defines the respective holding time duration as a function of the magnitude of the exceeding or undershooting of the respective limiting value. Furthermore, a plurality of individual dependences can be stored for each dynamic-movement variable, thus, for example, in each case an individual dependence for each driving program, in order to define the holding time duration not only as a function of the degree of exceeding and/or undershooting of the respective limiting value, but also additionally as a function of the selected driving program, that is to say as a function of whether a sports driving program or an offroad driving program or an onroad driving program is activated.

Dependences, on the basis of which the control unit 16 defines the respective holding time duration automatically, can be either linear dependences or non-linear dependences. It is thus possible that, as is shown by way of example in FIG. 2, the holding time duration increases as the extent of the exceeding or undershooting of the respective limiting value increases. This increase can then be determined either in a linear relationship or in a non-linear relationship. In contrast to this, other dependences are also possible, however, on the basis of which the holding time durations are defined. Said dependences can be parameterized freely in the control unit 16, for example via characteristic curves or characteristic diagrams or via formulaic dependences.

What is claimed:

1. A control unit of a pneumatic ride level control system of a motor vehicle, wherein: the control unit deactivates at least one function of the pneumatic ride level control system and/or activates at least one function of the pneumatic ride level control system if a limiting value of at least one dynamic-movement variable is exceeded or undershot, keeping the or each deactivated function deactivated for a defined holding time and/or keeping the or each activated function activated for a defined holding time duration after a subsequent undershooting or exceeding of the limiting value, and subsequently ending the deactivation of the or each deactivated function and/or the activation of the or each activated function after the respective holding time duration has elapsed, wherein the control unit defines the respective holding time duration as a function of the magnitude of the exceeding or undershooting of the respective limiting value.

2. The control unit as claimed in claim 1, wherein, when a transverse acceleration of the motor vehicle and/or a longitudinal acceleration of the motor vehicle and/or a vertical acceleration of the motor vehicle exceed/exceeds a limiting value, said control unit deactivates a function of the pneumatic ride level control system automatically and, in the case of a subsequent undershooting of the limiting value, keeps it deactivated automatically for a defined holding time duration, and in that said control unit defines said holding time duration as a function of the magnitude of the exceeding of the respective limiting value.

3. The control unit as claimed in claim 2, wherein, when the transverse acceleration of the motor vehicle and/or the longitudinal acceleration of the motor vehicle and/or the vertical acceleration of the motor vehicle exceed/exceeds a limiting value, said control unit activates another function of the pneumatic ride level control system automatically and, in the case of a subsequent undershooting of the limiting value, keeps it activated automatically for a defined holding time duration, and in that said control unit defines said holding time duration as a function of the magnitude of the exceeding of the respective limiting value.

4. The control unit as claimed in claim 1, wherein, when a transverse speed of the motor vehicle and/or a longitudinal speed of the motor vehicle and/or a yaw speed of the motor vehicle exceed/exceeds a limiting value, said control unit deactivates a function of the pneumatic ride level control system automatically and, in the case of a subsequent undershooting of the limiting value, keeps it deactivated automatically for a defined holding time duration, and in that said control unit defines said holding time duration as a function of the magnitude of the exceeding of the respective limiting value.

5. The control unit as claimed in claim 4, wherein, when the transverse speed of the motor vehicle and/or the longitudinal speed of the motor vehicle and/or the yaw speed of the motor vehicle exceed/exceeds a limiting value, said control unit activates another function of the pneumatic ride level control system automatically and, in the case of a subsequent undershooting of the limiting value, keeps it activated automatically for a defined holding time duration, and in that said control unit defines said holding time duration as a function of the magnitude of the exceeding of the respective limiting value.

6. The control unit as claimed in claim 1, wherein an individual limiting value is stored for each dynamic-movement variable in said control unit, the control unit deactivating at least one function and/or activating at least one function if said limiting value is exceeded or undershot.

7. The control unit as claimed in claim 1, wherein an individual dependence is stored for each dynamic-movement variable in said control unit, on the basis of which dependence the control unit defines the respective holding time duration as a function of the magnitude of the exceeding or undershooting of the respective limiting value.

8. The control unit as claimed in claim 1, wherein, furthermore, said control unit defines the respective holding time duration as a function of an activated driving program comprising an activated sports driving program, an activated offroad driving program, or an activated onroad driving program.

9. The control unit as claimed in claim 8, wherein individual dependences are stored for each driving program in said control unit, on the basis of which dependences the control unit defines the respective holding time duration as a function of the magnitude of the exceeding or undershooting of the respective limiting value.

10. The control unit as claimed in claim 8, wherein individual limiting values are stored for each driving program in said control unit, the control unit deactivating at least one function and/or activating at least one function if said individual limiting values are exceeded or undershot.

11. A pneumatic ride level control system of a motor vehicle, having pneumatic springs which are coupled via air lines to an air supply and having actuable valves which are assigned to the air lines and can be actuated by a control unit, wherein the control unit deactivates at least one function of the pneumatic ride level control system and/or activates at least one function of the pneumatic ride level control system if a limiting value of at least one dynamic-movement variable is exceeded or undershot, keeping the or each deactivated function deactivated for a defined holding time and/or keeping the or each activated function activated for a defined holding time duration after a subsequent undershooting or exceeding of the limiting value, and subsequently ending the deactivation of the or each deactivated function and/or the activation of the or each activated function after the respective holding time duration has elapsed, wherein the control unit defines the respective holding time duration as a function of the magnitude of the exceeding or undershooting of the respective limiting value.

* * * * *

UNITED STATES PATENT AND TRADEMARK OFFICE
CERTIFICATE OF CORRECTION

PATENT NO. : 8,712,638 B2  
APPLICATION NO. : 13/585150  
DATED : April 29, 2014  
INVENTOR(S) : Thomas Sprengel et al.

Page 1 of 1

It is certified that error appears in the above-identified patent and that said Letters Patent is hereby corrected as shown below:

On the Title Page, Item (73), Assignee, "Dr. Ing. H.C. F. Porsche Aktiengesellschaft"

should read -- Dr. Ing. h.c. F. Porsche Aktiengesellschaft --.

Signed and Sealed this  
Fifth Day of August, 2014

Michelle K. Lee  
*Deputy Director of the United States Patent and Trademark Office*